(12) United States Patent
Cerciello

(10) Patent No.: US 7,976,667 B2
(45) Date of Patent: Jul. 12, 2011

(54) MACHINE FOR BONDING FILMS MADE OF DIFFERENT MATERIALS IN SEVERAL LAYERS, AND THE CORRESPONDING METHOD

(75) Inventor: Antonio Cerciello, Piacenza (IT)

(73) Assignee: Nordmeccanica S.p.A., Piacenza (IT)

( * ) Notice: Subject to any disclaimer, the term of this patent is extended or adjusted under 35 U.S.C. 154(b) by 71 days.

(21) Appl. No.: 12/361,202

(22) Filed: Jan. 28, 2009

(65) Prior Publication Data

US 2009/0188612 A1 Jul. 30, 2009

(30) Foreign Application Priority Data

Jan. 30, 2008 (IT) .............................. PC2008A0004
Dec. 12, 2008 (EP) ..................................... 08171469

(51) Int. Cl.
*B29C 65/54* (2006.01)
*B32B 37/12* (2006.01)
(52) U.S. Cl. ..................... 156/324; 156/551; 156/555
(58) Field of Classification Search .................. 156/516, 156/543, 547, 549, 550, 551, 555, 313, 324
See application file for complete search history.

(56) References Cited

U.S. PATENT DOCUMENTS

| | | | | |
|---|---|---|---|---|
| 3,655,488 A | * | 4/1972 | Goldstein et al. | 156/379.8 |
| 3,960,475 A | * | 6/1976 | DeLigt et al. | 425/505 |
| 4,190,475 A | * | 2/1980 | Marschke | 156/157 |
| 7,101,455 B1 | | 9/2006 | Hase et al. | |
| 2003/0098130 A1 | * | 5/2003 | Kiener et al. | 156/498 |
| 2004/0108405 A1 | * | 6/2004 | Lindner | 242/534 |

FOREIGN PATENT DOCUMENTS

| | | |
|---|---|---|
| DE | 198 15 115 A1 | 10/1999 |
| EP | 1 314 551 A1 | 5/2003 |
| EP | 1 543 957 A1 | 6/2005 |
| EP | 1 616 696 A1 | 1/2006 |
| WO | WO 03/023166 A1 | 3/2003 |
| WO | WO 2004/089267 A1 | 10/2004 |

\* cited by examiner

*Primary Examiner* — Kat Wyrozebski
*Assistant Examiner* — Scott W Dodds
(74) *Attorney, Agent, or Firm* — Notaro, Michalos & Zaccaria P.C.

(57) ABSTRACT

Method for bonding together up to three layers in a film, which may be made of layers of different materials. The method includes unwinding from pay-off units layers of the film and guiding them into a spreader/applicator units designed to apply an adhesive material to one side of the layers and feeding them to a bonding zone (1), bonding together the layers in the bonding zone, by winding them over a first bonding calender (18), along a contact arc on the surface of said calender. The method is characterized by determining the breadth of said contact arc by rotating a nip onto which the presser roller (19) is mounted, so as to vary the position of the point of contact between a presser roller (19) and the surface of said bonding calender (18). The bonded film is then taken up.

10 Claims, 5 Drawing Sheets

MACHINE FOR BONDING FILMS MADE OF DIFFERENT MATERIALS IN SEVERAL LAYERS, AND THE CORRESPONDING METHOD

This invention relates to a machine to bond a number of layers using solventless adhesive to obtain a single film consisting of a series of layers (multilayer film), and the corresponding method. More particularly, it is able to bond films composed of materials which can be of a nature similar to and/or different from one another, and even more particularly, at least two films are composed of materials having different compositions such as plastics, paper or aluminium.

The machine according to the invention is configured to bond three layers of film to one another; the operation can be performed in two different ways. The first involves simultaneously bonding three layers of film, unwound from three different reels, in the same bonding device; in most cases, this is the solution that maximises the performance of the machine. The second procedure, which is necessary for some types of material, involves bonding the first two layers to one another in the first part of the machine, and subsequently bonding them to a third layer in a second bonding device.

In the present description, the term "film" refers to the films that are unwound from the reels mounted on the machine; these films can be single layer or multi-layer films previously bonded.

Specifically, the machine comprises three pay-off units that feed the layers of film, two of which are associated with spreader/applicator units. Each unit includes an adhesive tank and means for picking up said adhesive and transferring it in a thin layer to an applicator roller which moves in contact with the drum.

The various layers of film are conveyed to a bonding zone, where the two bonding devices and the finished product rereeler are installed.

The machine and the method according to the invention are highly advantageous, because they allow to bond two or more films in a single operation. Moreover, the finding of the present invention allows to provide machines that are extremely compact in size being far smaller than conventional systems which, in order to bond several layers, require the same number of bonding machines as the number of layers, connected in series.

Another advantage of the machine according to the invention relates to the fact that it can also be configured for use as a machine for bonding two films only (Duplex action).

Bonding machines which bond two films while they advance, possibly at high speed, using a solventless adhesive, are already available on the market, such as the one described in European patent no. 0324892 filed by the present applicant.

These machines usually comprise a pay-off unit that feeds a film from a reel, associated with a spreader/applicator unit that spreads a small amount of adhesive (about 1-2 $g/m^2$) onto the surface of the film as it advances, and a second pay-off unit that feeds from a second reel a film destined to be bonded to the preceding film in a bonding unit, which also contains a rereeler onto which the film obtained is wound.

Bonded materials consisting of several layers of films are used in a number of industries. For example, in the packing and food industries, multilayer films are required which may comprise a layer of material suitable to come into contact with foodstuffs, a second layer that is impermeable to liquids or gases, a third layer that provides sufficient strength, and other layers which may consist, for example, of printable material, heat-sealable material and the like.

A series of in-line bonding machines are normally used to manufacture multilayer films; two films are bonded in a first machine and then conveyed to the second machine, in which they are bonded to a third film.

This solution is obviously not only cumbersome, but also extremely expensive in terms of both the initial investment and the maintenance and running costs, especially as each of these machines can be up to 10-15 metres long and require several thousand Kw to run.

The present invention, which falls into this sector, relates to a machine, and the relevant method, designed to bond up to three films simultaneously, which is very compact and absorbs much less energy than conventional systems.

In particular, the machine according to the invention operates by using two methods of bonding a 3-ply film, depending on the materials used.

The first method involves simultaneous bonding of three films, two of which are spread with an adhesive material by spreader/applicator units in a single bonding unit.

The second method involves bonding two films in a first bonding unit and subsequently bonding them to the third film in a second bonding unit; in this way different forces, and consequently pressures, can be applied to the two bonding units depending on the materials used, in order to obtain the best results for the finished product.

These and other characteristics will appear more clearly from the detailed description set out below, provided by way of example but not of limitation, by reference to the annexed figures wherein.

Figure 1:
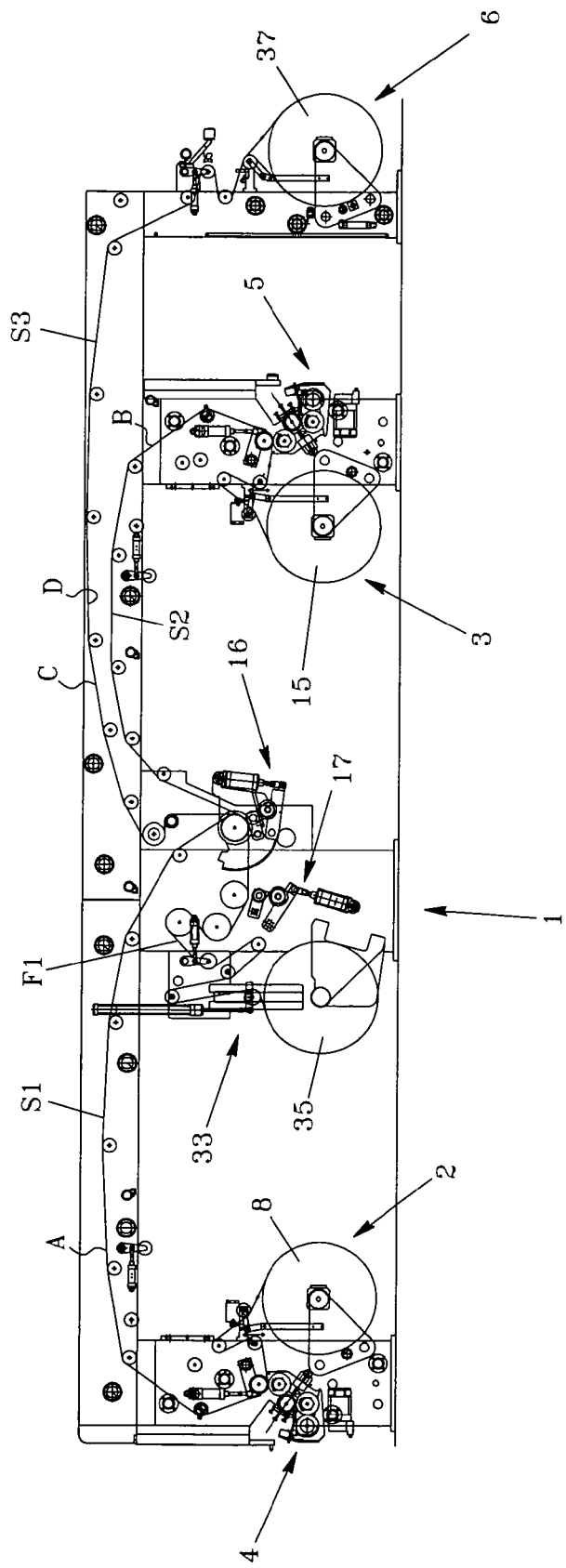
FIG. 1 is a side view of the layout of the machine, configured for bonding three films by the first method according to the invention.

As shown in FIG. 1, the machine according to the invention comprises a bonding zone 1, two pay-off units 2 and 3 associated with 2 spreader/applicator units 4 and 5, and a third pay-off unit 6.

Pay-off unit 2 comprises a support 7 for a reel 8 that feeds a film layer S1, which passes through spreader/applicator unit 4 and is then bonded in bonding zone 1.

Figure 3:
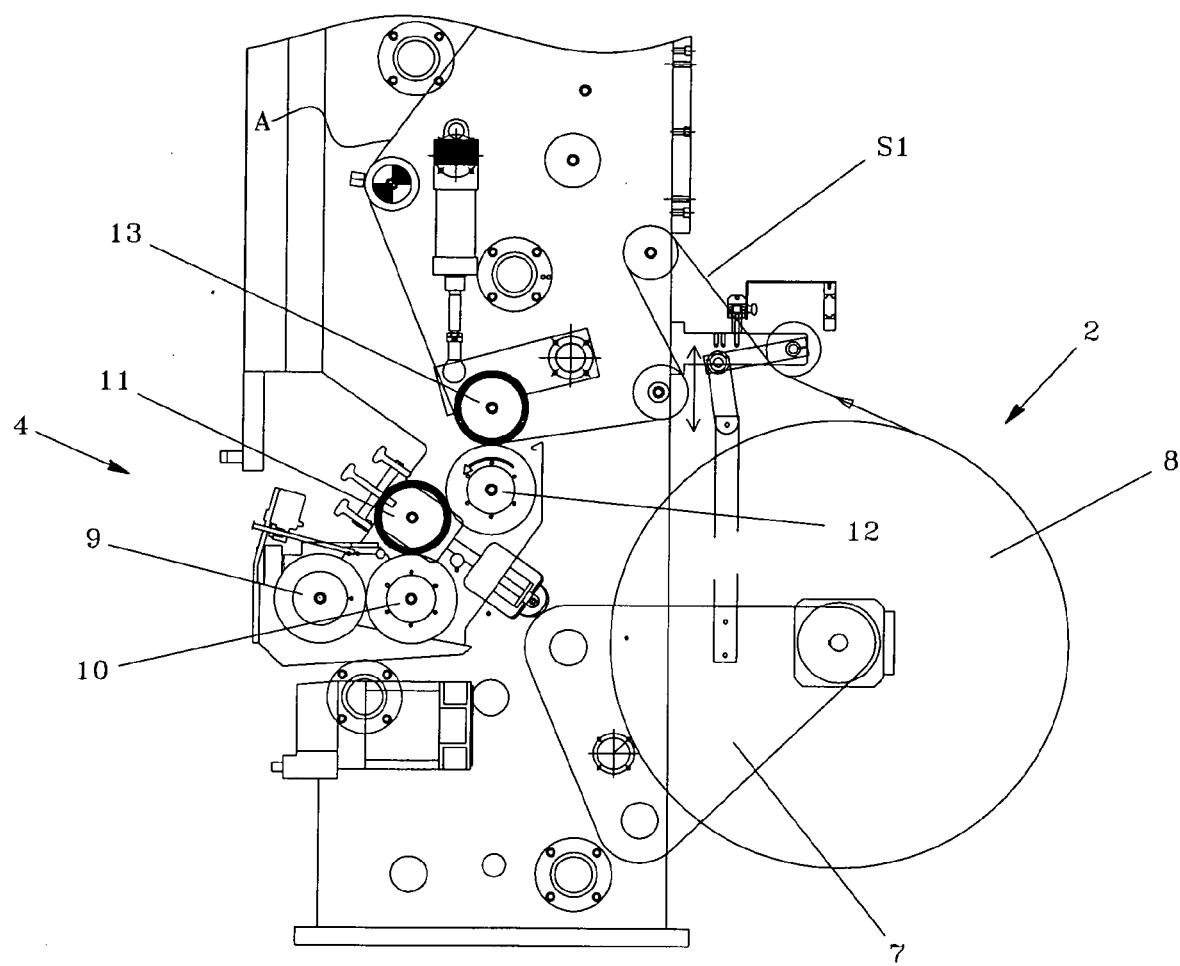
FIG. 3 is a side view of a spreader/applicator unit.
Figure 4:
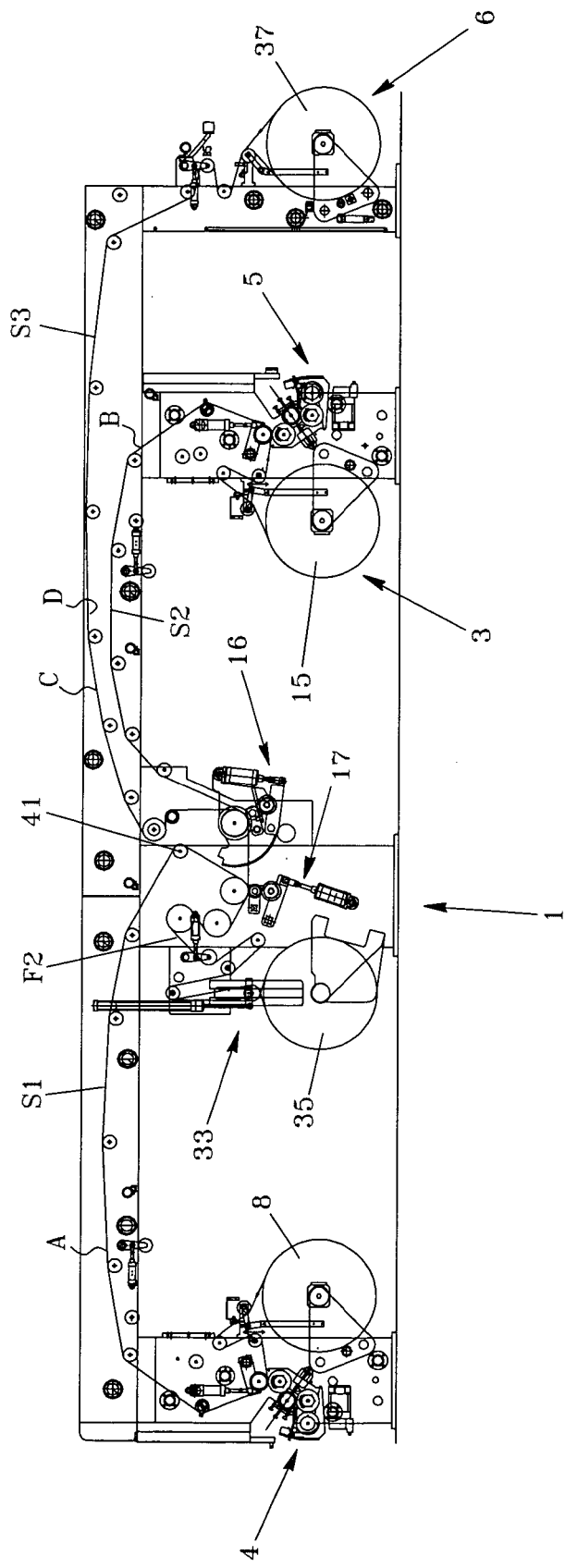
FIG. 4 is a side view of the layout of the machine, configured for bonding three films by the second method according to the invention.

As shown in FIG. 3, said spreader/applicator unit comprises a pair of rollers 9 and 10 in contact with one another. A seating formed between said rollers 9 and 10 constitutes the tank that contains the adhesive to be spread on the films.

The mutual position of rollers 9 and 10 is adjustable with devices of known type, so as to leave a space of adjustable thickness, namely a few tenths of a millimetre, between the two rollers, so that when at least one of said rollers is rotated it takes up a thin layer of adhesive material, the thickness of which depends on the distance between the rollers. Said adhesive material is then transferred to a third or intermediate roller 11, which rotates around its axis at a speed greater than that of roller 10.

The thickness of the layer of adhesive transferred to roller 11 is thus reduced. Downstream of intermediate roller 11 there is a third roller or applicator roller 12 driven by a motor, not shown in the figure, which causes it to rotate at a speed greater than that of roller 11, so that the layer of adhesive material previously transferred from roller 10 to roller 11 is transferred to roller 12, further reducing its thickness.

A small portion of film S1, inserted between applicator roller 12 and a presser roller 13, comes into contact with said applicator roller 12, so that a layer of adhesive material a few microns thick is transferred onto said film.

Said spreader unit, which is already known in itself, substantially corresponds to the spreader unit described in the above-mentioned European patent 0324892.

Pay-off unit 3 also has a support 14 for a reel 15 which feeds a layer of film S2 destined to be bonded subsequently in bonding zone 1, and is associated with a spreader/applicator unit 5 identical to unit 4 described above.

The third pay-off unit 6 is equipped with a support 36 for a reel 37 which feeds a layer of film S3; unlike the other two pay-off rollers, in this case there is no spreader/applicator unit, because bonding is effected by the layer of adhesive material deposited on the other two films.

Reels of aluminium foil are generally placed on pay-off roller 6; as this material is thin and not elastic it is rather fragile, and consequently tears easily. Moreover, especially in the case of routes in which it passes over a plurality of transmission rollers, it is liable to form creases which are impossible to eliminate, and remain visible in the final bonded film.

Bonding zone 1 has two bonding units 16 and 17.

Unit 16 is constituted by a heated bonding calender 18, mounted on abutments 40 of the machine and in contact with a presser roller 19, driven by a motor not shown in the figure, and counter-rotating with said calender.

Roller 19 is mounted on a support 20 which, in turn, is hinged to a rotating nip 31, whose axis of rotation coincides with that of calender 18. A second support 21 for a second roller 22, which is in contact with roller 19 and counter-rotates with it, is also hinged to calender 18.

The rod of a hydraulic actuator 23 is fixed to the end of support 21. The pressure exerted by roller 21 on roller 19 can be regulated via said actuator, and the pressure exerted on bonding calender 18 can be indirectly regulated via roller 19.

The rotation of nip 31 allows the point of contact between calender 18 and presser roller 19 to be varied, determining the breadth of the contact arc of the various layers of film bonded on calender 18. More or less heating of the film may be required during bonding, depending on the materials used, said heating being regulated on the basis of the time for which the film comes into contact with the calender or the breadth of the contact arc with the calender.

The second bonding unit 17 is similar to the one just described, but is not fitted with a rotating nip.

Bonding calender 24, mounted on abutments 40 of the machine, is in contact with a counter-rotating presser roller 25 and mounted on a support 26 hinged to abutments 40.

A second roller 27, in contact with roller 25, is mounted on a second support 28, also hinged to abutments 40, to the end of which the rod of a hydraulic actuator 29, having the same function as actuator 23 described above, is connected.

Two cooling calenders 30, designed to cool the bonded film before it is wound onto drum 32 to form the finished product reel, are installed at the exit from the bonding units.

As this is a 3-ply film (ie. one consisting of three layers), and consequently fairly thick, the winding unit is equipped with a vertical presser 33 fitted with a roller 34 which is kept pressed against reel 35 to compact the bonded film as much as possible.

The pressure exerted by the presser roller can be regulated by adjusting the pressure of the hydraulic fluid in actuator 38 connected to roller 34.

The device runs vertically to follow the increase in diameter of reel 35 as the bonded film is rereeled.

The operation of the machine according to the invention is described below, according to the different methods of use.

In FIG. 1, the machine according to the invention is configured to bond three films simultaneously in the same bonding unit.

The present invention also relates to a method for bonding three films using the same bonding unit; this method comprises the following operations:
 i) two films are fed and guided into the spreader/applicator units designed to apply an adhesive material onto said films;
 ii) the third film is fed;
 iii) the three films are directed towards the bonding zone where the films are adhesively bonded to each other; and
 iv) the final film composed of the layers bonded by means of the adhesive material is taken out.

No adhesive material is applied to the third film that is fed during stage (ii). More in particular, in the method of the present invention film S1 is unwound from reel 8 and conveyed to spreader/applicator unit 4 where, as it runs over presser roller 13, it comes into contact with applicator roller 12 which leaves a thin layer of adhesive material on the upward-facing surface A of the film.

Film S1 is then conveyed to bonding zone 1 via a series of idle rollers.

Similarly, film S2 is unwound from reel 15 and sent to spreader/applicator unit 5, which deposits a layer of adhesive material on the upward-facing surface B.

Film S3, unwound from reel 37, passes over a pre-heating calender 39, which increases the film temperature to facilitate bonding, before reaching bonding zone 1.

The three films S1, S2 and S3, guided by a set of idle rollers, converge in zone 1 where said third film S3 is inserted between the first two films S1 and S2, with adhesive spread on sides A and B, respectively adjacent to the sides C and D of the third film S3; the three films are then wound onto heated calender 18 and caused to adhere to one another by the pressure exerted by roller 19, which presses film F1, now bonded, onto calender 18.

Bonded film F1 then passes over the two cooling calenders 30 and, once cooled, is wound onto drum 32 to form finished product reel 35. In this case the second bonding unit 17 is not used; film F1 runs over calender 24 but presser roller 25 is disengaged, and does not exert any pressure on film F1.

Figure 2:
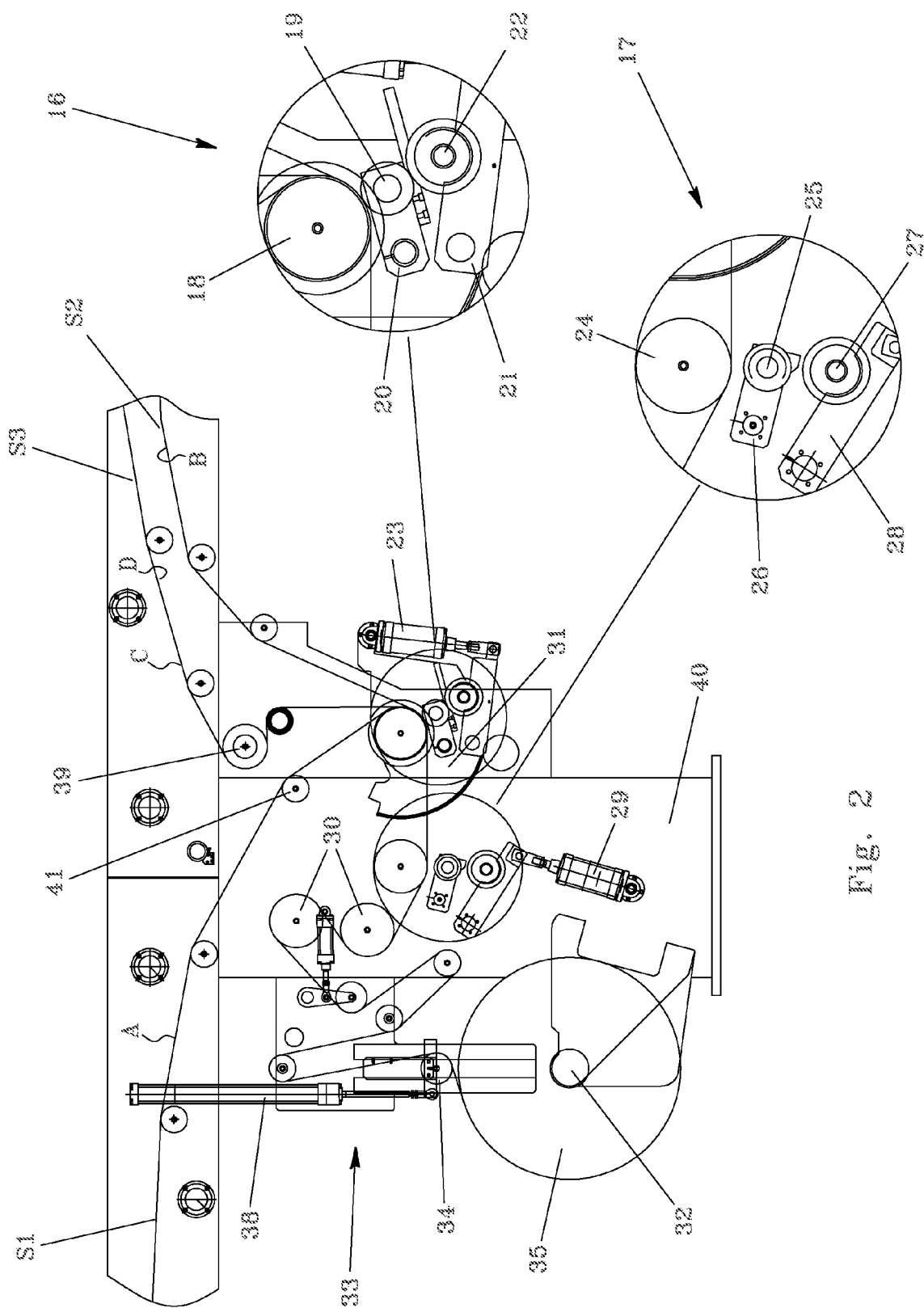
FIG. 2 is a side view of the bonding zone.

The present invention also relates to a method wherein the machine is configured to bond three films in two different stages as illustrated in FIG. 2.

Said method comprises the following operations:
 i) two films are fed and guided into the spreader/applier units designed to apply an adhesive material to said films;
 ii) a third film is fed;
 iii) two of said films, one of which is spread with adhesive material, and the other without adhesive coating, are guided towards a first bonding zone where the adhesion action of the two said film occurs;
 iv) the two previously bonded films and the other film spread with adhesive material are guided towards a second bonding unit where the adhesion bonding of the three films occurs;
 v) the final film composed of the various layers of film bonded to one another by means of an adhesive material, are taken out.

More particularly the aforesaid method for bonding a total of three films during two separate stages involves the operations described below:

the stage relating to the unwinding of films S1, S2 and S3 and application of the layer of adhesive material to films S1 and S2 is identical to the one described above.

Film S2, with the layer of adhesive material on its upper surface B, and film S3, are conveyed, via idle rollers, to the bonding zone, where they are wound onto calender 18, caused to adhere together and compacted by presser roller 19.

Film S1, after passing over guide roller 41, enters the second bonding unit, to which bonded films S2-S3 output from the first bonding unit are also conveyed; here, film S1, partly wound onto calender 24, and bonded films S2-S3, are caused to adhere together by the pressure of roller 25, driven by actuator 29. The final bonded film F2 is then cooled by calenders 30 and wound onto reel 35.

If only two layers of film need to be bonded (2-ply film), it is sufficient to eliminate one of the two reels that pay out the film spread with the layer of adhesive material, ie. film S1 or S2.

Figure 5:
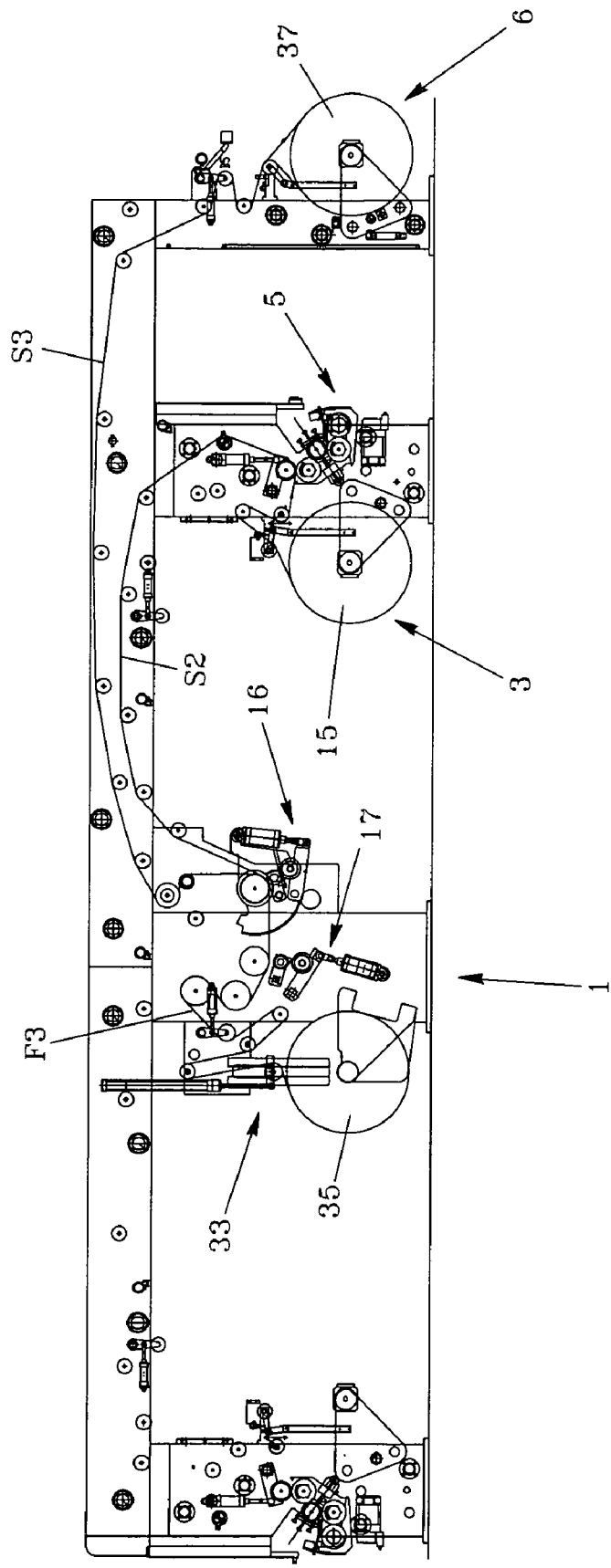
FIG. 5 is a side view of the layout of the machine, configured for bonding two films.

An example of a configuration of the machine is shown in FIG. 5.

In this case film S2, with the layer of adhesive material, and film S3, are fed and then bonded in the first bonding unit by the same procedure as described above.

Alternatively, both reels which feed the film with the layer of adhesive material can be kept mounted and used alternately with the other film without adhesive; in this way it would be possible to manufacture two different types of 2-ply film without reconfiguring the machine, thus saving a considerable amount of time.

The machine and the method according to the invention are highly innovative and flexible, because it enables different types of film, consisting of up to three films, to be obtained with a compact machine that is easily adaptable to the different types of work to be performed.

An expert in the field could devise various modifications and variations, all of which should be deemed to fall within the ambit of this invention.

The invention claimed is:

1. Method for bonding together up to three layers in a film, which may be made of layers of different materials, comprising the following steps:
   unwinding from a first pay-off unit (2) a first layer (S1) of said film and guiding it into a first spreader/applicator (4) unit designed to apply an adhesive material to one side of said first layer and feeding it to a bonding zone (1);
   unwinding from a second pay-off unit (3) a second layer (S2) of said film and guiding it into a second spreader/applicator unit (5) designed to apply an adhesive material to one side of said second layer and feeding it to the bonding zone (1);
   unwinding from a third pay-off unit (6) a third layer (S3) of said film and feeding it to the bonding zone (1);
   bonding together in said bonding zone at least the first layer (S1) and the third layer (S3) by winding said at least first and third layers over a first bonding calender (18), along a contact arc on the surface of said calender, and pressing said layers by a presser roller (19, 25) which is subject to the action of hydraulic actuator (23, 29);
   taking up the bonded film;
characterized by determining the breadth of said contact arc by rotating a nip (31) onto which the presser roller (19) is mounted, so as to vary the position of the point of contact between a presser roller (19) and the surface of said bonding calender (18).

2. Method according to claim 1, characterized by bonding said second layer (S2) to the already bonded first (S1) and third (S3) layers by winding all said layers over a second bonding calender (24) in said bonding zone.

3. Method according to claim 1, characterized by heating said bonding calenders (18, 24).

4. Method according to claim 2, characterized by heating said bonding calenders (18, 24).

5. Method according to claim 3, characterized by cooling the bonded film at the exit of said bonding calenders (18, 24), before it is wound as the finished product onto a reel (35).

6. Method according to claim 4, characterized by cooling the bonded film at the exit of said bonding calenders (18, 24), before it is wound as the finished product onto a reel (35).

7. Method according to claim 3, characterized by creating pressure over a reel (35) of the bonded film, during winding of the film, thus considerably compacting the reel and reducing its size.

8. Method according to claim 4, characterized by creating pressure over a reel (35) of the bonded film, during winding of the film, thus considerably compacting the reel and reducing its size.

9. Method according to claim 5, characterized by creating pressure over the reel (35) of the bonded film, during winding of the film, thus considerably compacting the reel and reducing its size.

10. Method according to claim 6, characterized by creating pressure over the reel (35) of the bonded film, during winding of the film, thus considerably compacting the reel and reducing its size.

* * * * *